2,944,943

PREPARATION OF DL-LYSINE WITH LYSINE RACEMASE

Hsing T. Huang, Fresh Meadows, N.Y., assignor to Chas. Pfizer & Co., Inc., New York, N.Y., a corporation of Delaware No Drawing. Filed May 21, 1958, Ser. No. 736,663

8 Claims. (Cl. 195—29)

This invention is concerned with a method of producing a new enzyme system. More particularly, it is concerned with a process for producing lysine racemizing activity by growing cultures of certain microorganisms. This application is in part a continuation of my application Serial No. 675,004, filed July 30, 1957, and now abandoned.

There is in the literature no previous report of the existence of lysine racemizing activity, hereinafter referred to as lysine racemase, in any microorganism. It has now been unexpectedly discovered that certain microorganisms when grown in nutrient media under certain specified conditions produce lysine racemase, which has been demonstrated to be of considerable use to the chemical industry in the synthetic production of L-lysine.

Synthetic lysine is prepared by chemical means in the form of the racemic compound, i.e. DL-lysine, from which L-lysine is obtained by standard resolution procedures. The utilization of the remaining D-lysine, which constitutes fifty precent of the racemic compound, would be of prime importance to the chemical industry in increasing the potential of the synthetic production of L-lysine. D-lysine has been partially converted to DL-lysine by chemical racemization which is the subject of U.S. Patents 2,586,154, and 2,536,360. DL-lysine is then resolved by the usual methods from the racemic compound and residual D-lysine repeatedly racemized and resolved to produce more L-lysine. As is well-known, L-lysine is a very important essential amino acid.

It has now been found that, through the use of lysine racemase, obtained from certain microorganisms, the racemization of D-lysine to the racemic compound, i.e. DL-lysine, is effected in a one hundred percent conversion by a readily facile method which will be obvious from the disclosure of this invention which follows. L-lysine is racemized in the same way with identical results. Thus a novel enzyme system, most useful to the chemical industry for the production of L-lysine, an important essential amino acid, has been discovered. The process for producing this novel and useful enzyme system, i.e. lysine racemase, consists of growing certain microorganisms in nutrient media. It is important that the medium contain sources of carbohydrate, organic nitrogen as well as inorganic nitrogen, such as ammonium salts. The organisms are propagated on nutrient agar and rinsed from the slant under sterile conditions into the nutrient media described above. The seeded sterile solutions are grown for from several hours to one day at from 20° to 40° C. to provide inoculum for larger stirred aerated vessels that are used for submerged fermentation, although surface fermentation may be employed, if desired. The submerged fermentation is carried out for the period of time required for maximum growth which may be from several hours to several days depending on the amounts of the nutrients available. With the nutrient media as herein described, a period of approximately one day provided the maximum growth, which is determined by standard procedures, such as turbidity measurements.

Of course, it should be understood that maximum growth of organisms is not required for production of lysine racemase which is produced and contained in the bacterial cells as growth progresses. Only in the interest of producing maximum amounts of lysine racemase, are the organisms subjected to maximum growth in the media herein described and this should not be construed as a limitation of this invention. The fermenter medium may be adjusted to a pH value of from 6.0 to 8.0, although the preferable pH range is from 6.5 to 7.5.

A temperature of from 20° to 40° C. may be used for the fermentation, although temperatures in the range of from 25° to 40° C. are found preferable.

After growth of the organisms, selected on the basis of a hereinafter described test, the lysine racemizing activity may be employed in several ways. The bacterial cells, after adjustment of the fermenter medium to a pH from 7.0 to 9.0, preferably from about 8.0 to about 8.5, are contacted with lysine. The fermenter medium then is covered with a thin layer of toluene to prevent contamination. The mixture, after shaking for from 10 to 30 minutes, is allowed to stand for from several hours to two days, depending on the amounts of lysine to be racemized, during which a temperature of from about 20° to about 40° C. is employed. The preferred temperature is from about 25° to about 40° C. It is not necessary to release the enzyme, lysine racemase, from the bacterial cells since lysine is capable of penetrating the cell walls and contacting the lysine racemase within the cell. A second method of utilizing lysine racemase in the cells of the organism is the removal of the bacterial cells from the fermentation medium, suspending these cells, after thorough water washing, in aqueous medium and buffering to a pH of from 7.0 to 9.0 preferably from 8.0 to 8.5. A fermentation medium, made up of a nutrient medium as herein described, yielded from 4.2 to 4.7 grams of dried bacterial cells per liter, although, using richer nutrient, more bacterial cells may be obtained.

Although the activity of the enzyme system within the cells was found to be excellent for the purposes of racemizing lysine, the lysine racemase may be released from the cells by any of several different procedures which yield cell-free elaboration products. These include grinding, particularly with abrasive materials such as powdered glass or sand, use of ultrasonic energy, repeated, rapid freezing and thawing and so forth. Detailed descriptions for the use of the isolated, resuspended cells and of cell-free elaboration products are given in the textbooks "Manometric Technique in Tissue Metabolisms," by M. W. Umbreit et al., Burgess Publishing Company, Minneapolis (1949), and "Respiratory Enzymes," by H. Lardy, Burgess Publishing Company, Minneapolis (1949).

The organisms which are found to produce lysine racemase under the conditions of this invention are species of the genus, Proteus, and the genus Escherichia which are readily available in public type culture collections, for example, the American Type Culture Collection of Washington, D.C., where the following species are obtained; *P. vulgaris*, ATCC 4669; *P. ammoniae*, ATCC 7002; *P. mirabilis*, ATCC 9921; *P. americanus*, ATCC 4675; *P. paraamericanus*, ATCC 6059; *P. rettgeri*, ATCC 9918; *P. spingidis*, ATCC 6911; *E. anindolica*, ATCC 6879; *E. freundii*, ATCC 8454; *P. inconstans*, ATCC 12013. The organisms which produce lysine racemase are readily determined by a relatively simple procedure; detecting the presence of L-lysine in the reaction mixture obtained by contacting D-lysine with the organism under test. The detection method may be one of several standard procedures, for example, employing the enzymatic decarboxylation of L-lysine, i.e. L-lysine decarboxylase from *Bacterium candaveris*, NCCT 6578, and measuring the evolved carbon dioxide. The procedure used is fully described in standard texts, as in "Methods in Enzymology," edited by S. P. Colowick and N. O. Kaplan, vol. 3, p. 462, Academic Press, New York (1957).

The amounts of D-lysine that may be racemized depend primarily on the amount of enzyme activity of the bacterial cells, i.e. lysine racemase contained in the bacterial cells, employed. In general, when the bacterial cells from one liter of the fermentation medium, as herein described, were used, from 80 to 150 grams of D-lysine, as the hydrochloride, are racemized, in 100% conversion, to the racemic compound, DL-lysine. After the reaction is complete, the L-lysine content of the mixture is determined as fifty percent of the total lysine content, i.e. one hundred percent conversion of D-lysine to DL-lysine, by enzyme test with L-lysine decarboxylase, as described above. The total lysine content of the reaction medium is determined by quantitative paper chromatography using standard procedures.

The DL-lysine is obtained from the reaction medium in almost pure form by any desired known means, for instance, by absorption on a sulfonic acid resin, such as Amberlite IR-120 (ammonium cycle), elution with dilute alkali and drying of the effluent. Additional purification, if necessary, is then carried out by standard method of crystallization. The L-lysine content of the crystalline racemic compound is further demonstrated by microbiological assay, e.g. *Leuconostoc mesenteroides* growth, using a standard method based on the absolute requirement of the microorganism for the amino acid. The procedure used is available in standard texts, for example, "The Microbiological Assay of Vitamin B Complex and Amino Acids," by F. C. Barton Wright, Pitman & Sons, London (1952).

The following examples are given solely for the purpose of illustration and are not to be construed as limitations of this invention, many variations of which are possible without departing from the spirit or scope thereof.

*Example I*

*P. vulgaris*, ATCC 4669, was propagated on an agar nutrient medium rinsed from the slant under sterile conditions into 500 ml. of the following medium in a Fernbach flask which has been previously sterilized by autoclaving for 30 minutes at 20 pounds/square inch pressure:

| | G./l. |
|---|---|
| $K_2HPO_4$ | 7.0 |
| $KH_2PO_4$ | 3.0 |
| Tri sodium citrate | 0.4 |
| $MgSO_4.7H_2O$ | 0.1 |
| Yeast extract | 0.5 |
| Glucose (sterilized separately) | 10.0 |
| $(NH_4)_2SO_4$ | 0.1 |

The organism was grown in this medium with shaking at 28° C. for 20 hours.

One hundred milliliters of the inoculum culture was added under sterile conditions to 2 liters of the following medium which had been previously sterilized by autoclaving for 60 minutes at 20 pounds/square inch pressure.

| | G./l. |
|---|---|
| Cornsteep liquor | 20 |
| $(NH_4)_2HPO_4$ | 10 |
| Crude beet molasses | 20 |
| Crude glycerol | 10 |
| $MgSO_4.7H_2O$ | 1 | pH adjusted to 7.5 with $NH_4OH$.

The inoculated medium was incubated with agitation at the rate of 1750 revolutions/minute for 22 hours at 28° C. The broth was subjected to paper chromatography which showed the absence of lysine.

To two hundred and fifty milliliters of this broth was added 20 grams of D-lysine hydrochloride. The mixture was adjusted to pH 8.3 with amonium hydroxide and four milliliters of toluene added. It was then shaken for 10 minutes and incubated at 28° C. for 20 hours, at the end of which time, the D-lysine was converted to DL-lysine in 100% yield. The L-lysine was assayed at 50% of the total lysine content by enzyme test with L-lysine decarboxylase from *Bacterium cadaveris*, NCTC 6578, by standard procedures.

The reaction mixture was adjusted to pH 3.4 with hydrochloric acid and filtered. DL-lysine was obtained by ion-exchange treatment with sulfonic acid resin Amberlite IR-120 (ammonium cycle). Purification by standard methods of crystallization yielded pure DL-lysine hydrochloride. The L-lysine content of this mixture was determined as fifty percent of microbiological assay with *Leuconostoc mesenteroides* growth by standard procedure. Optical rotation is zero.

*Example II*

An experiment was conducted as in Example I except that the fermentation medium had the following composition:

| | G./l. |
|---|---|
| $K_2HPO_4$ | 7.0 |
| $(NH_4)_2HPO_4$ | 3.0 |
| $(NH_4)_2SO_4$ | 1.5 |
| $MgSO_4.7H_2O$ | 0.1 |
| Yeast extract | 0.2 |
| Glucose monohydrate (sterilized separately) | 10.0 |

The fermentation process was run as in Example I and the organisms utilized as indicated with the same results being obtained.

*Example III*

*P. vulgaris*, ATCC 4669, was cultivated by the same method as described in Example I. After maximum growth, the fermentation broth was centrifuged and the bacterial cells thoroughly washed in water. The dried cells from one liter of the fermentation broth weighed 4.5 grams.

The bacterial cells from two hundred and fifty milliliters of the fermentation broth were resuspended in water, the medium adjusted to pH 8.3 with buffer and four milliliters of the toluene added. Twenty grams of D-lysine was then added and the racemization accomplished as described in Example I.

*Example IV*

The process of Example I was repeaed useing the organism *P. ammoniae*, ATCC 7002, with identical results.

*Example V*

The process of Example I was repeated using the organism *P. mirabilis*, ATCC 9921, with identical results.

*Example VI*

The process of Example I was repeated using L-lysine with identical results.

*Example VII*

The process of Example I was repeated using *P. paraamericanus*, ATCC 6059, with identical results.

*Example VIII*

The process of Example I was repeated using *P. americanus*, ATCC 4675, with identical results.

*Example IX*

The process of Example I was repeated using *P. rettgeri*, ATCC 9918, with identical results.

*Example X*

The process of Example I was repeated using *P. sphingidis*, ATCC 6911, with identical results.

Example XI

The process of Example I was repeated using *E. anindolica*, ATCC 6879, with identical results.

Example XII

The process of Example I was repeated using *E. freundii*, ATCC 8454, with identical results.

Example XXIII

The process of Example I was repeated using *P. inconstans*, ATCC 12013, with identical results.

What is claimed is:

1. A process for the production of lysine racemase which comprises growing a strain of an organism selected from the group consisting of *P. vulgaris, P. ammoniae, P. mirabilis, P. americanus, P. paraamericanus, P. rettgeri, P. spingidis, P. inconstans, E. anindolica* and *E. freundii*, in an aqueous nutrient medium containing sources of carbohydrate, organic nitrogen and inorganic nitrogen, at an intial pH value of from about 6.0 to about 8.0, and recovering said lysine racemase.

2. Lysine racemase obtainable by the process of claim 1.

3. The process of racemizing D-lysine which comprises contacting said D-lysine with lysine racemase.

4. The process as claimed in claim 1 wherein the microorganism is *P. vulgaris*, ATCC 4669.

5. The process as claimed in claim 1 wherein the microorganism is *P. ammoniae*, ATCC 7002.

6. The process as claimed in claim 1 wherein the microorganism is *P. mirabilis*, ATCC 9921.

7. The process as claimed in claim 1 wherein the microorganism is *P. americanus*, ATCC 4675.

8. The process as claimed in claim 1 wherein the microorganism is *P. paraamericanus*, ATCC 6059.

References Cited in the file of this patent

Journal of Biological Chem., vol. 153, pp. 387 to 399 (1944).

The Enzymes, by Sumner et al., vol. II, part I, Academic Press Inc., New York (1951), pp. 534–535.

Biochemistry of the Amino Acids, by Meister, Academic Press Inc., New York (1957), pp. 152 to 157.